UNITED STATES PATENT OFFICE.

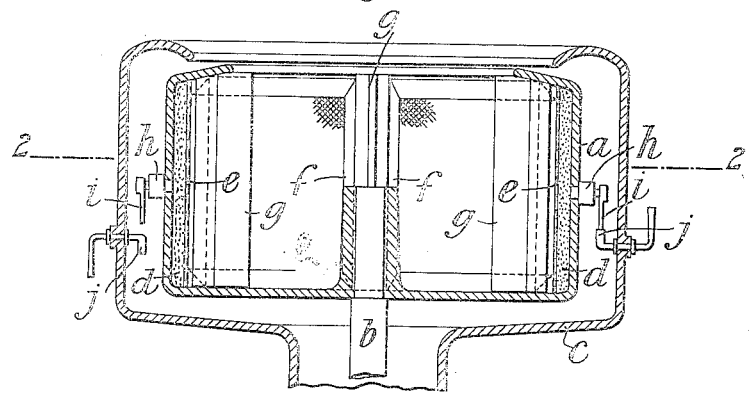
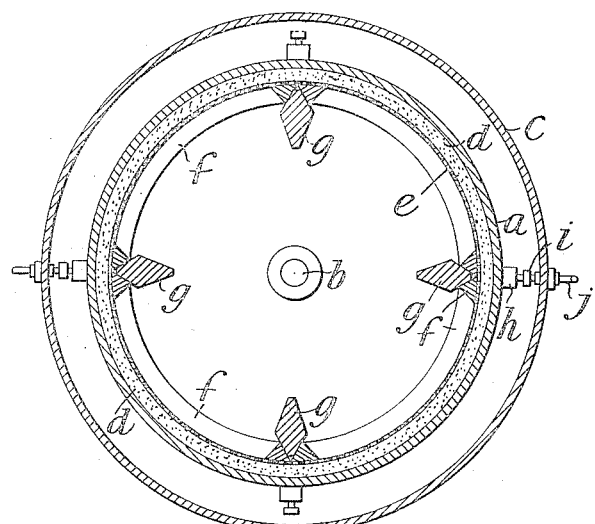
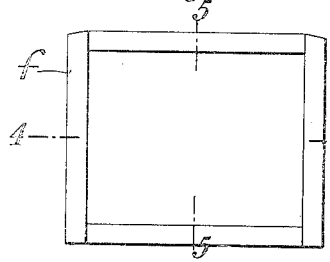
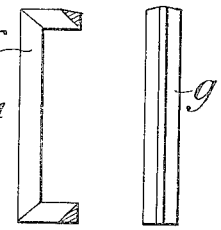
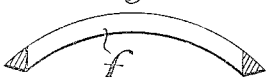

HARRY SIDNEY SMITH, OF CALEDONIA, TOBAGO, BRITISH WEST INDIES.

MANUFACTURE OF INDIA-RUBBER AND APPARATUS THEREFOR.

972,030.  Specification of Letters Patent. Patented Oct. 4, 1910.

Application filed April 5, 1909. Serial No. 487,953.

*To all whom it may concern:*

Be it known that I, HARRY SIDNEY SMITH, a subject of the King of Great Britain, residing at Caledonia, Tobago, British West Indies, have invented new and useful Improvements in or Connected with the Manufacture of India-Rubber and Apparatus Therefor; and I do hereby declare that the following is a full, clear, and exact description of the invention, which will enable others skilled in the art to which it appertains to make and use the same.

My invention relates to the separation of india-rubber from the latex which exudes from the trees.

Heretofore it has been proposed to separate the gum from the latex while the latter is in a liquid or semi-fluid condition by the action of centrifugal force. In practice, however, it has not been possible to carry out this process efficiently, for the reason that, owing to the consistency of the separated gum which is of less specific gravity than the other part of the latex, it is not possible to remove such gum by the ordinary skimming process within the drum, and also by reason of the fact that, if the drum is stopped the gum at once commences to recombine with the more liquid separated portion.

According to my invention, I overcome the difficulty by discharging the more liquid and impure portion of the latex during the rotation of the drum, so that practically the whole of the gum is separated and is obtained in the form of a sheet.

In a suitable arrangement for carrying out my invention, I make use of a centrifugal machine, the bowl of which has a closed wall, the said bowl being fitted with valves which can be opened during the rotation of the bowl to discharge those portions of the latex which are of greater specific gravity than the gum, and which I have referred to as the "liquid," so that when the machine is brought to rest the gum alone remains and can be removed. To this end I advantageously arrange around the walls of the bowl a porous material which will absorb, and permit of the passage of the "liquid;" this porous material may have applied to it a sheet of material such as canvas.

With this construction of apparatus, on the centrifugal machine being rotated and the latex introduced into the rotating bowl, the said latex is separated into the portions of different specific gravity, that is to say, the "liquid" and the gum, the pressure of the "liquid" within the closed bowl retaining the two portions in the separated condition. On the aforesaid valves being opened, the "liquid" passes out through the porous material, and through the valves, the gum then extending and collecting, or being applied against the inner surface of the porous material, or of the canvas or other lining in contact therewith. The machine is then stopped and the gum sheet removed from the bowl, together with the screen upon which it is applied, and from which it can subsequently be separated.

It is found in practice that it is impossible to completely separate the "liquid" from the other portion of the latex, so that there would always remain behind in the machine a certain proportion of impurities. It is for this reason that I employ the absorbent or porous layer, as this layer retains the small residuum of "liquid," and prevents it passing into the next charge of latex.

To enable my invention to be fully understood, I will describe the same by reference to the accompanying drawing, in which:—

Figure 1 is a section of the upper part of a centrifugal machine suitable for carrying the invention into practice, and Fig. 2 is a section on the line 2—2, Fig. 1. Fig. 3 is a view of a frame which is employed in the apparatus. Figs. 4 and 5 are sections on the lines 4—4 and 5—5 respectively of Fig. 3, and Figs. 6 and 7 are an elevation and plan of one of a series of locking pieces used in connection with the aforementioned frames.

*a* indicates a centrifugal bowl of ordinary construction mounted upon a spindle *b*, and *c* a casing around the same for collecting the "liquid" discharged from the drum.

*d* is a layer of felt, earthenware, or other absorbent material which is arranged in contact with the walls of the drum, and *e* is a layer or screen of canvas or other material which lies against this absorbent layer, and upon which the rubber is collected.

*f, f* are frames which serve to confine the layers *d* and *e* in their proper positions and *g, g* are wedge pieces which are arranged between the ends of the said frames, and which, under the centrifugal action, tend to hold the same in their proper relative positions.

$h, h$ are valves of any suitable construction which are arranged in the sides of the bowl, which valves are normally closed, but which at the required stage of the proceedings are adapted to be opened to allow the "liquid" to escape. As shown the stem of each valve is provided with an arm $i$, which is designed as the drum rotates, to come into contact with a projection $j$ in the casing $c$, the said projection being so arranged that, when in one position as shown at the left hand of Fig. 1, it will be out of contact with the said arm, and when turned into another position, as shown at the right hand of Fig. 1, will operate the said arm to open the valve.

In using the apparatus, the latex is introduced into the bowl in the usual manner, and under the centrifugal action the "liquid" or portion of heavier specific gravity, finds its way toward the wall of the bowl, while the gum collects in the same way that the cream collects on the inner surface of the milk in a milk separator. When this condition has been attained the device $j$ is turned so as to come into contact with the arms $i$ on the valves $h$, with the result that the said valves are opened and allow the "liquid" to escape, while the gum remains. When the drum is stopped and the frames $f$ with the locking pieces $g$ are removed, the said screen $e$, with the gum upon it, can be taken out of the bowl and subsequently stripped from the said screen, which can be again used, the rubber being in the form of sheets of a very pure nature.

It will be understood that the construction above described is only given as an example and that other forms of centrifugal than that shown may be used, and that other means may be provided for allowing the "liquid" to escape at the required stage of the process.

Having now particularly described and ascertained the nature of my said invention and in what manner the same is to be performed, I declare that what I claim is:—

1. In apparatus for separating the liquid portions of rubber latex from the gum, the combination with a rotatable drum having imperforate walls, and provided with normally closed liquid discharging means, of a layer of porous material extending around the drum within the same, a screen for collecting the gum extending around the drum within the layer of absorbent material, and means for opening the said discharging means for the drum while the latter is rotating.

2. In apparatus for separating the liquid portions of rubber latex from the gum, the combination with a rotatable imperforate drum, of an annular lining of porous absorbent material, within and adjacent to the wall of the drum, an annular screen within the said porous absorbent lining, for collecting the gum thereon, removable devices for holding the said screen and lining in position, and normally closed devices for discharging liquid from said porous absorbent material from the drum during the rotation of the same, and means for opening said discharging devices while the drum is rotating.

3. In apparatus for separating the liquid portions of rubber latex from the gum, the combination with a rotatable imperforate drum, of a removable lining of porous absorbent material, a removable screen composed of material which will permit the passage of liquid therethrough but will retain and collect the gum, arranged within the layer of absorbent material normally closed devices for discharging liquid from the absorbent material during the rotation of the drum, and means for opening the discharging devices while the drum is rotating.

4. In apparatus for separating the liquid portions of rubber latex from the gum, the combination with a rotatable drum, of a removable annular lining of felt within the casing, an annular screen of canvas within the lining, segmental removable frames for holding the screen and lining in position, wedge pieces for holding said frames in position, said drum being provided with apertures in its outer wall, normally closed valves controlling said apertures, actuating arms connected with said valves, and a rotatable device, located adjacent to the travel of said arms and provided with a tripping projection adapted to be turned into or out of engagement with said arms.

HARRY SIDNEY SMITH.

Witnesses:
JOHN E. BOUSFIELD,
C. G. REDFERN.